Sept. 20, 1932.   H. E. IVES   1,878,147
ELECTROOPTICAL TRANSMISSION
Original Filed Sept. 10, 1927   2 Sheets-Sheet 1

INVENTOR
HERBERT E. IVES
By
ATTORNEY

Sept. 20, 1932.    H. E. IVES    1,878,147
ELECTROOPTICAL TRANSMISSION
Original Filed Sept. 10, 1927    2 Sheets-Sheet 2
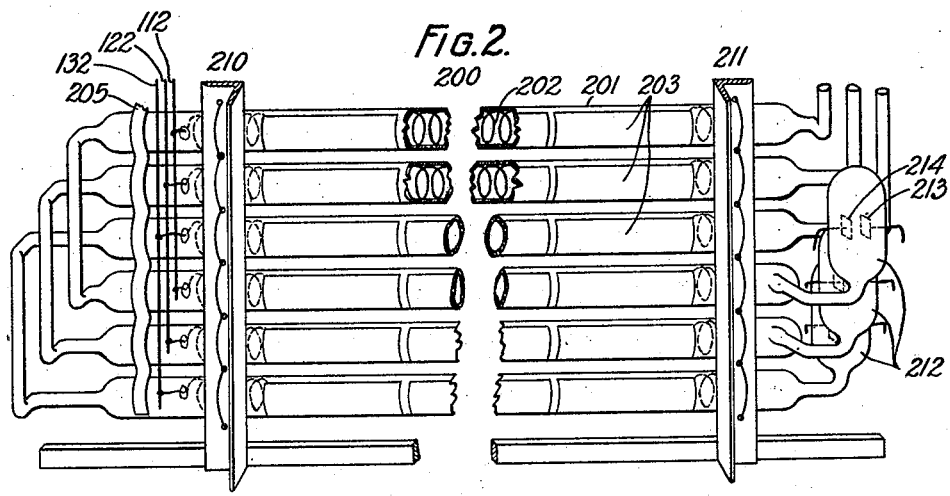
FIG. 2.
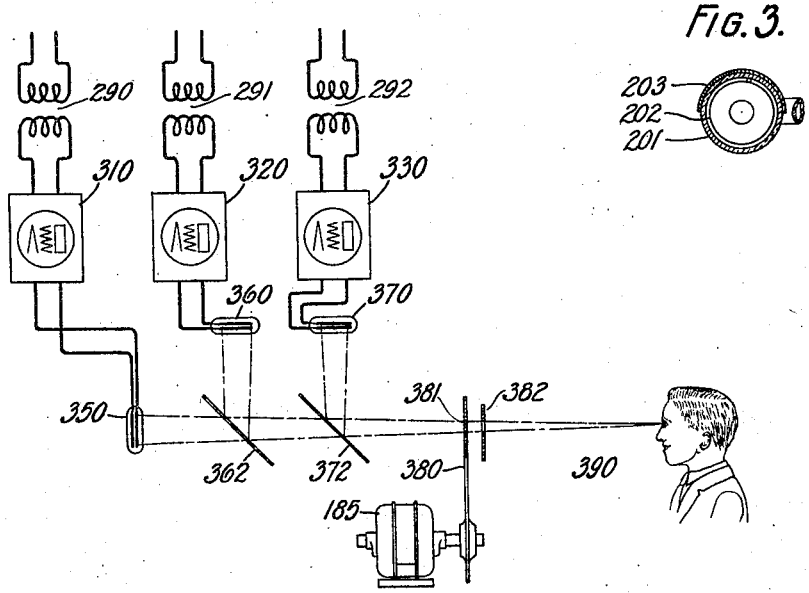
FIG. 4.
FIG. 3.
INVENTOR
HERBERT E. IVES
By
ATTORNEY Patented Sept. 20, 1932

1,878,147

UNITED STATES PATENT OFFICE

HERBERT E. IVES, OF MONTCLAIR, NEW JERSEY, ASSIGNOR TO BELL TELEPHONE LABORATORIES, INCORPORATED, OF NEW YORK, N. Y., A CORPORATION OF NEW YORK

ELECTROOPTICAL TRANSMISSION

Application filed September 10, 1927, Serial No. 218,631. Renewed April 28, 1930.

This invention relates to electro-optical transmission and more particularly to the electrical production of images of moving objects or pictures in their natural colors.

In a television system such as that disclosed in the copending application of Frank Gray, Serial No. 227,649, filed Oct. 21, 1927, the object whose image is to be produced electrically is illuminated point by point by an intense beam of light passing through apertures in a rotating disc. Reflected light from the object falls upon a light sensitive cell and is translated into electric current varying in amplitude in accordance with the varying reflecting power of the object from point to point. Successive scannings take place within the period of the persistence of vision which is about $\frac{1}{16}$ of a second. The resultant current has frequency components lying within a range from 0 to 30,000 or 40,000 cycles per second of which components it is essential to transmit a major portion say from 10 to 15 cycles and up, the range required being dependent upon the degree of resolution to be obtained in the produced image and the size of the object.

The methods of scanning or analysis, and synthesis, as developed and described in the above mentioned application are limited to monochrome television. In accordance with the present invention means are provided for developing the principles of a monochrome system into a three-color arrangement for the electrical production of pictures in the natural colors of the object whose image is transmitted.

In an embodiment of the invention chosen for illustration and described in detail hereinafter, three light-sensitive cells, each selective by virtue of its natural sensitivity or by the use of "color filters" to certain portions of the spectrum such as those corresponding to the primary colors, are excited by light reflected from the object. The selective light sensitive cells are connected to three amplifier and control networks, one for each primary color, and these in turn are connected to three transmission channels. A plurality of light sensitive cells sensitive to each of the primary colors may be used if desired, and to correct for the different relative sensitivities of the different color sensitive cells more red than green and more green than blue sensitive cells may be used. Also, different degrees of amplification may be used for the different primary colors. The three cells or groups thereof are so disposed around the object to be scanned as to afford substantially the same point of view of the object for all cells of a set or group. If this condition is greatly deviated from, the transmitted image will show color fringes.

In one form of the invention, at the receiving station, three sets of intermeshed grid-like tubular glow discharge lamps occupy and illuminate the viewing field, each set being similarly distributed over one-third of the field. The sections of the different lamps are preferably so arranged that juxtaposed strips of red, green, and blue illumination are generated. Each of the lamps arranged to produce strips of light of a given color is energized by a corresponding channel originated in scanning at the transmitting station. The three different sets of lamps preferably contain three different gases, possibly in conjunction with colored glass in the tube sections, so chosen that the grid arrangement presents juxtaposed tube sections of the different sets of lamps which emit red, green and blue light, respectively. Small elemental areas of each one of these tubes are successively electrically energized in varying amounts in synchronism with corresponding elemental areas of the object whose image is produced.

In another form, at the receiving station, three glow discharge lamps, one for each primary color, are so arranged that the light from each is simultaneously directed onto the entire field of view and by means of a suitable scanning arrangement only one elemental area of the field corresponding to that of the object being scanned is exposed to view at any instant. In this arrangement, each lamp has an illuminated area equal to the whole viewing field which is illuminated at each instant by each primary color in accordance with the intensity of the illumination of an elemental area of the object whose image is being produced but only one elemental area of each lamp is exposed to view at any instant; while in the previously described arrangement only one elemental area of the lamps is illuminated at any instant. The transmitting arrangement may be the same for both receiving arrangements.

A more detailed description of the invention follows and is illustrated in the accompanying drawings.

Fig. 2 is a partial detailed rear view of the grid type multiple electrode glow discharge lamps showing the juxtaposed positioning of the tube sections of the three sets of lamps, one for each primary color.

Fig. 3 is a cross section of one of the tubes of the glow discharge lamps.

Fig. 4 is a schematic representation of a modified receiving arrangement employing a rotating scanning disc for distributing the light over the image area.

Figure 1:
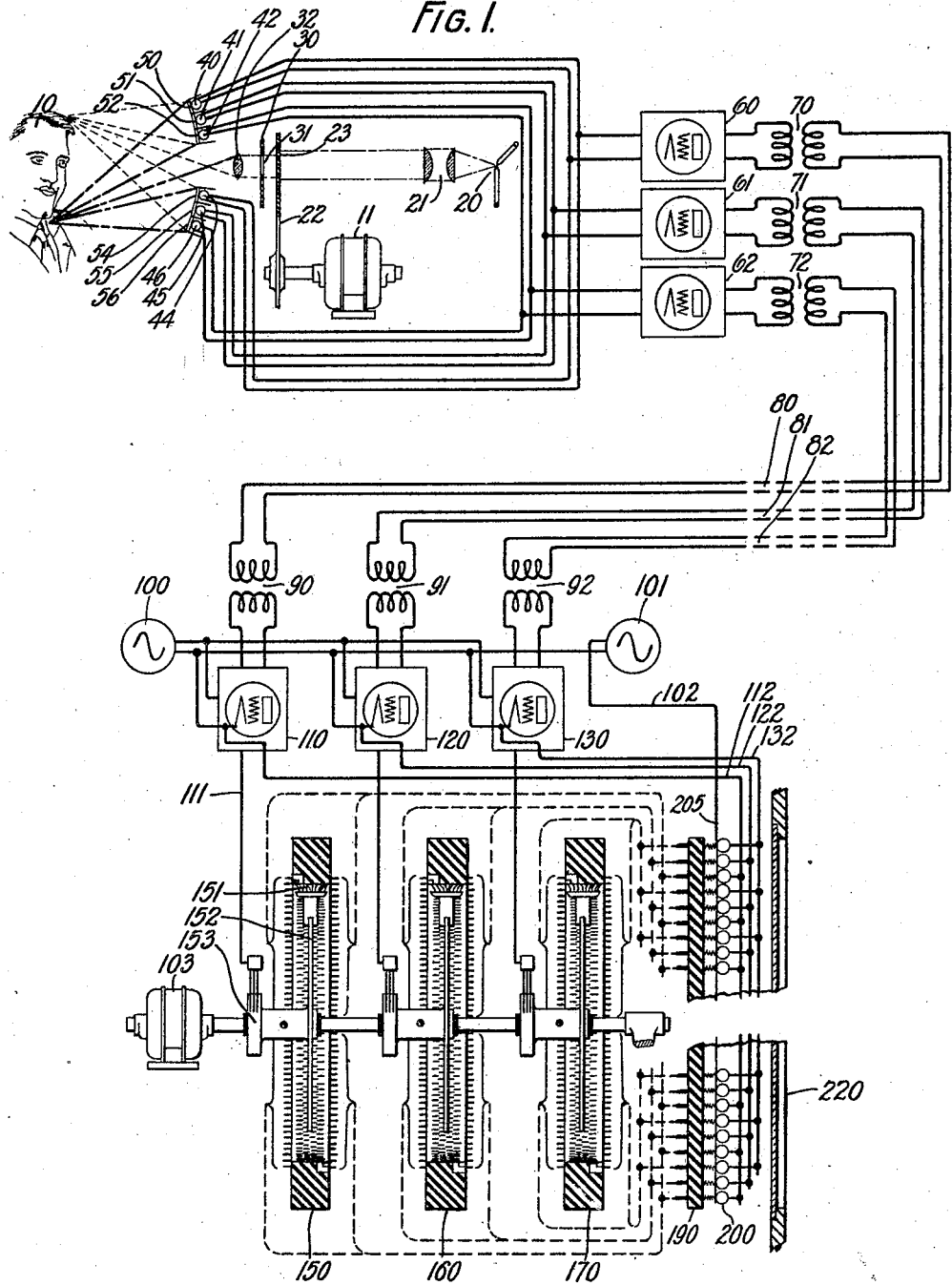
Fig. 1 is a schematic representation of a color television system showing the electrical and mechanical terminal elements selected for illustrating this invention.

Referring to Fig. 1, the scanning apparatus at the transmitting station includes a powerful light source 20, whose light is directed by means of the lenses 21 upon the scanning area of the scanning disc 22. The path of the scanning light from the light source is through one of the apertures 23 in the scanning disc, the apertured screen 30, whose opening 31 is so dimensioned that the light coming through only one aperture in the disc 22 can at any instant pass, and a lens 32, to the object 10 whose image is transmitted. The scanning disc 22 is rotated at a substantially uniform speed by the driving motor element 11. As the scanning disc is rotated it causes a small beam of intense light, passing successively through each one of its apertures, to scan in a series of parallel paths the object whose image is transmitted, and reflected light from each elemental area of the objects so illuminated is successively impressed upon a plurality of color selective light sensitive translating devices 40, 41, and 42, one for each primary color.

Each of the different translating devices as a result of the scanning operation generates current variations in accordance with the primary light color values of the elemental areas of the object, and each is connected with an individual electrical transmission channel. Further details of a single channel scanning and light translating arrangement applicable to this system are shown in the copending application of Frank Gray, Serial No. 227,649, filed Oct. 21, 1927, supra. A suitable synchronizing system is disclosed in the patent of H. M. Stoller and E. R. Morton, No. 1,763,309, issued June 17, 1930.

The selective light sensitive cells 40, 41 and 42 are either inherently selective or are made selective by positioning light filters 50, 51 and 52 between the cells and the object 10. By means of this selectivity three channels are established, and each channel is maintained from its origin at the light sensitive cell in the transmitting station to the receiving lamps in the receiving station. A plurality of groups of color selective light sensitive cells may be used and a second group 44, 45 and 46 with their respective filters 54, 55 and 56 similar to the first group are shown. The light sensitive cells responsive to the same color or spectral band are connected to the same channel. As heretofore stated the light sensitive cells of any group responsive to all of the different primary colors are positioned close together so as to view the object through as small an angle as practicable in order to prevent the separate channels producing their part of the received picture as though the object were illuminated by differently located colored light sources which would cause the produced image to show color fringes.

At the selective light sensitive cells the light energy in accordance with the reflective power and the primary color value of the elemental area of the object being scanned is translated into electric current. The electric current from each different color selective light sensitive cell is amplified and controlled by suitable amplifiers 60, 61 and 62 for each channel, respectively. These amplifiers are arranged so that the amount of amplification can be adjusted as desired for each channel and thus permit adjusting the output current from all channels to the proper strength irrespective of any difference in response due to the sensitivity of the different light sensitive cells used for the different primary colors or spectral bands. The several channels are connected through repeating coils 70, 71, and 72 with the transmission lines 80, 81, and 82, respectively. The several transmission lines are in turn connected with receiving apparatus through the repeating coils 90, 91 and 92, respectively.

The incoming picture current transmitted over the several channels is impressed upon separate receiving amplifier and control networks 110, 120, and 130, for each channel, respectively. The transmitted current in the arrangement shown is an alternating current of varying amplitude representative of light variations above and below the average tone value of the primary colors of the object being scanned. The advantages of employing current of this kind and further details of apparatus for its production are disclosed in a copending application of H. E. Ives and F. Gray, Serial No. 181,511, filed April 6, 1927.

The alternating signal current received from each transmission channel after being impressed upon its respective amplifier and control networks 110, 120, and 130 is caused to modulate a high frequency oscillating current generated by the oscillator 100. The modulated high frequency current of each channel is next passed through commutator distributors 150, 160, and 170 for each of the respective channels and from these distributors to multiple electrode glow discharge lamps 200. The receiving, amplifier and control networks 110, 120, and 130 and the several distributor commutators are each similar to those shown for a single channel system in the patent of Frank Gray, 1,759,504, issued May 20, 1930. The viewing field at the receiving station is illuminated by a set of three large multiple electrode glow discharge lamps, one electrode on each set being employed for each elemental area of the field and one lamp for each of the primary colors. The distributor commutators contain one contact for each element or individual electrode of the glow discharge lamps and connection is made between them by individual wires. Each distributor commutator at any instant connects with only one electrode on the glow discharge lamp and thereby limits the illumination to the elemental area defined by the connected electrode. In this system the several channels, one for each primary color, operate simultaneously and at each instant one elemental area for each channel or color is illuminated to the proper intensity. Each distributor commutator has a rotating brush and the brushes of all distributors are mounted on a single shaft but insulated therefrom and are driven synchronously and in phase with the scanning apparatus by means of the driving motor element 103.

The electrical circuits for the picture producing current flowing through the glow discharge lamps are from individual electrodes on the lamps each of which connects with an individual contact in the distributor commutators, to the common electrodes of the lamps. The multiple electrode glow discharge receiving light source, as heretofore stated, is divided into three separate lamps corresponding to the three primary colors or channels. By grouping or arranging the sections of each element so that the sections of each lamp are juxtaposed and one section of each channel is positioned at every third position across the viewing field, the field is uniformly covered by the different channels or different color producing elements of the glow discharge lamps. The electrodes of the different sections for each primary color are connected to the proper channel. The common conductors 112, 122, and 132 may group the various sections according to channels and in turn connect with the receiving amplifier and control networks 110, 120, and 130, respectively, of the various channels. The arrangement of the connections between the distributor commutator and the sections of the glow discharge lamp and of the common electrode with each section of the glow discharge lamps so as to uniformly distribute the sections associated with each channel preferably provides for connecting every third tube section, since three primary color channels are employed, to their respective channels. This arrangement of the connections is shown in both Fig. 1 and Fig. 2.

The circuit for the modulated high frequency picture current may be traced for one channel from the receiving circuit network 110, conductor 111, slip ring 153, brush arm 152, distributor brush 151, one of the contacts in the commutator distributor 150, one of the individual lead wires from such contact to an individual connection in the multiple contact panel 190, to an individual electrode on one of the glow discharge lamps 200 and common return lead 112, back to receiving circuit network 110. A similar circuit may be traced in connection with each of the other channels. As many individual wires connect between the distributor commutator contacts and the glow discharge lamps as there are individual electrodes on the lamps, though in the drawing this plurality of wires is shown by a few single lines for simplicity.

The response of the glow discharge lamp is much more sensitive to starting and to small current variations if the lamp is already under excitation when the signal current is impressed thereon, and this fact is taken advantage of by continuously exciting the lamp through a special set of electrodes so arranged as to avoid interfering with the luminosity of the viewing field. Such a continuous excitation is effected by an auxiliary high frequency current continuously applied to the gas at one end of each of the tube sections of the lamp. This second high frequency current may be supplied from a high frequency oscillator 101. One terminal of this oscillator connects by means of the conductor 102 to the auxiliary electrodes 205 on each tube section of the glow discharge lamps, while the other terminal of the oscillator connects through the receiving circuit network of the several channels with the common electrodes of the glow discharge lamps through the several lamp common return conductors 112, 122 and 132. The panel 220 positioned closely in front of the glow discharge lamps has a large opening which exposes to view the front side of the glow discharge lamps 200 producing a picture. For close viewing this opening may contain a panel of ground glass.

Three channels have preferably been shown and described as this number represents the primary colors. The operation of each channel is the same as any other channel with the exception that each light sensitive cell at the transmitting station is activated by its own selective light color or spectral band and each receiving lamp at the receiving station generates a light corresponding to one of the primary colors, and each channel is, with the exception above noted, in most respects substantially the same as that disclosed in the patent of Frank Gray 1,759,504, issued May 20, 1930, supra.

The glow discharge lamps 200 are shown in detail in Fig. 2. The three lamps are the same excepting as to the color of the light emitted which may be governed either by the character of the low pressure gas contained in each or by light filters associated with each or a combination of both. If light filters alone are used to determine the color of the light then only one gas containing chamber is necessary with a gas which emits light having a continuous visible spectrum. The gas containing chamber of each lamp is composed of a plurality of glass tubes positioned parallel to each other in a flat grid-like formation and connected in series with each other at their ends. This arrangement forms a continuous chamber in which the gas pressure is the same throughout and one which may cover a large area and at the same time stand atmospheric pressure without having the walls of the chamber unduly thick. The various tube sections are fastened by a lacing or other suitable means to the left and right separating members 210 and 211. Each tube section 201 has an interior common electrode 202 which may be in the form of an open spiral conductor extending throughout the length of a section, and a plurality of spaced individual electrodes 203 fixed along the exterior rear side of the tube sections. These exterior electrodes may be made of tinfoil or other suitable conducting material cemented to the tube sections. They extend circumferentially about 180° and longitudinally along the tube length a distance about equal to three times the diameter of the tube and thus have a front or projected rectangular area having a length about three times the width. Each electrode is separated to insulate it from the adjoining electrodes by small distances which may be a small fraction of its length. The adjoining tube sections are positioned in such proximity to each other that the exterior individual electrodes appear uniformly spaced throughout the entire area covered by the tubes. Three adjoining exterior electrodes preferably have a front or projected area which is substantially square and when such adjoining electrodes are energized the illuminated area is substantially square. The interior common electrode of each tube section is brought out at one end through a seal and connected to one of the common conductors 112, 122 or 132 in a manner to preferably group the various sections into channels as heretofore described. A special or auxiliary set of exterior electrodes 205, heretofore referred to, associate with all of the tube sections forms a common connection to all. This connection is used for continuously energizing each section of the lamps by passing a high frequency oscillating current from it across the end of each section to the interior common electrodes 202 to maintain a condition of excitation of the tubes which substantially eliminates lag in the response of the lamps when the individual electrodes are energized by the signal current.

A gas purifying chamber 212 is attached to each lamp. These purifying chambers contain two small electrodes 213 and 214 made of such material as pure magnesium which are connected to a suitable source of electric current by leads sealed through the side of the chamber. If a direct current having a voltage of the order of 150 volts is applied across these terminals, a discharge takes place which causes purification of the gas in the lamps in a well known manner.

A cross section of one of the tubular sections of a lamp is shown in Fig. 3. The relative position of the common internal electrode 202, the walls of the tube sections 201, and the individual external electrodes 203 are clearly shown in this drawing.

The apparatus and the operation of this multi-channel color system is similar in many respects to that of a single channel system. In the multi-channel system, however, obviously certain apparatus serves all channels. The position of the portion of the image transmitted by each channel, on the viewing screen is such that at each instant, the three areas illuminated in accordance with the three primary colors at each instant represents an elemental area corresponding to the elemental area of the object being scanned. The three primary colors simultaneously appearing at any instant on the viewing screen preferably cover a square area divided between each of the three primary colors, each color being positioned in a strip about one-third the width of the illuminated area representing an element of the produced picture at any instant.

The system of Fig. 1 is a multi-channel system from the point of analysis of the light effects of the object into the three primary colors at the transmitting station to the point of reproducing the light effects in the three primary colors on the viewing screen at the receiving station where the eye directly views and optically combines the three primary colors on adjacent elemental areas of the viewing screen. A modification of the receiving apparatus is shown in Fig. 4 in which the three primary colors are generated by three separate receiving lamps whose entire light emitting area is uniformly illuminated at each instant and their light directed by a semi-transparent mirror system so as to cause the light from each of the three primary color light sources to be superimposed and the combined light projected at each instant for a given elemental area into the eye of the observer. In this arrangement the large grid-like receiving lamps and their associated distributor commutator apparatus, one set for each primary color, are replaced by a corresponding number of receiving lamps, each have one light emitting area and a suitable scanning system for instantaneously directing the combined light of an elemental area into the eye of the observer. The three incoming transmission channels are connected through the repeating coils 290, 291, and 292 with the three amplifier and control networks 310, 320, and 330 which in turn are connected with the glow discharge lamps 350, 360, and 370 respectively. Each one of these glow discharge lamps emits light of one of the primary colors. These lamps are so positioned with reference to the semi-transparent mirrors 362 and 372 that the light from each is combined and directed on a small area 381 of the scanning disc 380. This scanning disc contains a series of small apertures arranged in spiral form similar to the scanning disc 22 at the transmitting station with which it is operated in synchronism and in phase by means of the synchronous driving motor element 185. The light from each of the three lamps associated with the three channels passes at any instant through one of the apertures in the scanning disc and is caused to rapidly sweep over the viewing field, formed by the opening in the screen 382, in a series of parallel lines and produce in color an image of the object in the eye of the observer 390.

The invention has been described above as utilizing the three primary colors. In some cases it may be desired to utilize only two colors, the same principles, however, applying. The invention therefore comprehends this modification.

What is claimed is:

1. The method of color television, comprising generating and directively moving a beam of light for successively and repeatedly illuminating the elemental areas of a three dimensional object, analyzing light reflected from the elemental areas of the said object into primary color components, translating the said components into electrical energy corresponding to the light intensity of the said components, and simultaneously transmitting the corresponding electrical energy components over separate channels, each channel being continuously assigned to the same color component.

2. In a system of electrical image production of moving objects or pictures, a source of light having a continuous spectrum within the visible range, a plurality of stationary selective light sensitive elements, each responsive to a different color of incident light, means for successively directing a beam of light from said source over the elemental areas of an object and causing reflected light from said object to simultaneously activate said light sensitive elements, transmission channels, sources of light of different colors controlled in accordance with the light activation of said light sensitive elements, and means for synthesizing light from said sources to produce an image of the said object.

3. The method of producing television images in natural colors at a receiving station which comprises receiving a plurality of image currents respectively representative of primary color components of the light utilized at the transmitting station for setting up said currents, and producing simultaneously a plurality of images of different primary colors respectively under control of said image currents, the corresponding elemental areas of said images being juxtaposed.

4. In a system of electrical image production of three dimensional objects, means for successively and repeatedly illuminating the elemental areas of an object, stationary means for simultaneously translating the light effects of the said object into electrical currents proportional respectively to the mixing quantities of a plurality of primary colors in said object, means for producing light of each primary color, means for actuating said light producing means under the control of said electric currents and means for optically synthesizing the light produced by said light producing means to cause an image of the said object to appear in natural colors.

5. A television system comprising a plurality of stationary light receiving means disposed around an object, each being light selective and having its maximum selectivity at a different portion of the visible spectrum, a scanning system successively illuminating elemental areas of the said object and causing reflected light from each elemental area to impinge upon the said light receiving means, an amplifier and control network connected with each light sensitive cell and a separate transmission channel leading from each of said networks to a receiving station.

6. A three-color television system comprising a plurality of light sensitive cells disposed around an object, each being sensitive to a different band of wave lengths, a scanning system successively illuminating elemental areas of the object and causing reflected light from each elemental area so illuminated to impinge upon the said light sensitive cells and thereby generate photoelectric currents, an amplifier and control network connected with each light sensitive cell, a separate transmission channel leading from each of said networks to a receiving station, means at the said receiving station for converting the said amplified photoelectric currents into light of the three primary colors, respectively, and means for causing the differently colored light to simultaneously illuminate a group of elemental areas of the field of view corresponding to a single elemental area of the object being scanned.

7. In a system of television for moving objects in natural colors, means for repeatedly illuminating a three dimensional object point by point and simultaneously activating at each instant primary color channels by reflected light from a given elemental area on an object thereby producing in each channel electric current corresponding in intensity to a primary color value of the said elemental area, each channel being continuously assigned to the same color component.

8. Receiving apparatus for producing television images of objects or moving pictures in natural colors comprising means for receiving a plurality of currents representative respectively of primary color components of the light utilized at the transmitting station for setting up said currents, and electro-optical light generating means energized under control of said received currents for simultaneously producing a plurality of images of different primary colors respectively, the elemental areas of said images corresponding to a given elemental area of the object or picture being juxtaposed.

9. An electro-optical system for transmitting images of moving objects or pictures in their natural colors comprising means for generating and directively moving a beam of light for repeatedly illuminating an object point by point, simultaneously functioning separate color channels, each channel being continuously assigned to the same color component, and means for transmitting all of the image currents necessary to the formation of an image of the field scanned over said channels.

10. The method of producing images of a field of view containing three dimensional objects which comprise generating and directively moving a beam of light for successively illuminating all of the elemental areas of said field with light of different colors, receiving the light diffusely reflected from each elemental area within a large solid angle upon color selective means, selecting light of different colors by said means and separately utilizing the selected light of different colors to set up electric currents, each current corresponding continuously to a given color component.

11. The method of producing images of a field of view containing three dimensional objects which comprises generating and directively moving a beam of light for successively illuminating all of the elemental areas of said field with light of different colors simultaneously, receiving the light diffusely reflected from each elemental area within a large solid angle upon color selective means, selecting light of different colors by said means, and separately utilizing the selected light of different colors to set up electric currents, each current corresponding continuously to a given color component.

12. Means for generating and directively moving a beam of light for successively illuminating all of the elemental areas of a field of view containing three dimensional objects with light of different colors, and receiving means for receiving composite light containing all of said colors reflected from said areas over wide solid angles, said receiving means comprising stationary means for selecting color components of said composite light and separately utilizing said components to set up electric currents.

13. Means for generating, and directively moving a beam of light for successively illuminating all of the elemental areas of a field of view containing three dimensional objects with light of different colors and receiving means for receiving light reflected from each of said areas over a wide solid angle, said receiving means comprising stationary filters for selecting light of different colors and photoelectric means associated with said filters respectively for utilizing the selected light to set up electric currents.

14. Means for generating and directively moving a composite beam of light for successively illuminating all of the elemental areas of a field of view containing three dimensional objects and receiving means for receiving said composite light reflected from each of said areas over a wide solid angle, said receiving means comprising stationary means for selecting color components of said composite light and separately utilizing said components to set up electric currents.

15. Means for successively illuminating all of the elemental areas of a field of view containing three dimensional objects comprising a source of composite light, an apertured scanning disc and optical means for transmitting light from said source to said elemental areas in the form of a narrow beam, and receiving means for receiving light from each of said elemental areas over a wide solid angle, said receiving means comprising stationary means for selecting color components of said composite light and separately utilizing said components to set up electric currents.

16. Means for producing an image of a large three dimensional field of view comprising means for successively illuminating elemental areas of said field of view with composite light, and means for receiving light reflected from each of said elemental areas over a wide solid angle, said receiving means comprising stationary color selective means of large area and disposed about said field of view, for selecting different color components of said reflected light, and means for utilizing said selected light to separately set up electric currents.

17. Means for producing an image in natural colors of a field of view containing three dimensional objects comprising means for generating and directively moving a composite beam of light for successively illuminating all of the elemental areas of the field of view, means for receiving light reflected from each of said elemental areas over a wide solid angle, said receiving means comprising stationary selecting means for selecting color components of composite light, and separately utilizing said selected components to set up electric currents, and means for translating said currents into light of appropriate intensity and colors positioned within a receiving field of view to produce the image.

18. Means for producing an image in natural colors of a field of view containing three dimensional objects comprising means for generating and directively moving a beam of composite light comprising red, green and blue light for successively illuminating all of the elemental areas of said field means for receiving light reflected from each elemental area over a wide solid angle, said receiving means comprising a plurality of light sensitive means each continuously selective of one only of said colors.

19. Means for producing a television image in color of a field of view containing three dimensional objects comprising means for generating and directively moving a beam of composite light for successively illuminating all of the elemental areas of the field and a plurality of stationary color selective light sensitive means of large effective area for receiving light reflected from each elemental area over a wide solid angle without the use of optical concentrating means and for separately utilizing selected color components to set up electric currents.

20. A television receiving system comprising a plurality of receiving channels, and a corresponding number of grid glow discharge lamps, each emitting light of a different color and each responsive to an electric current for controlling the intensity of the light from the said lamps.

21. Apparatus for producing television images in natural colors comprising groups of light producing elements, and means for electrically energizing said light producing elements to cause them to produce light, the elements of each group producing light of a different color and arranged in juxtaposed relation to each other.

22. Apparatus for producing television images in natural colors comprising groups of light producing elements, and means for electrically energizing said light producing elements to cause them to produce light, the elements of each group simultaneously producing light of different colors respectively.

In witness whereof, I hereunto subscribe my name this 8th day of September, A. D. 1927.

HERBERT E. IVES.